M. M. MUELLER.
STEERING GEAR LOCK.
APPLICATION FILED AUG. 22, 1917.
1,261,151.
Patented Apr. 2, 1918.
2 SHEETS—SHEET 1.
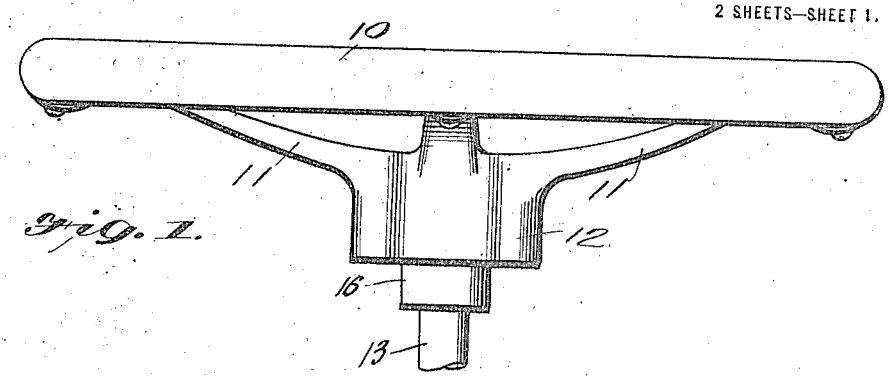
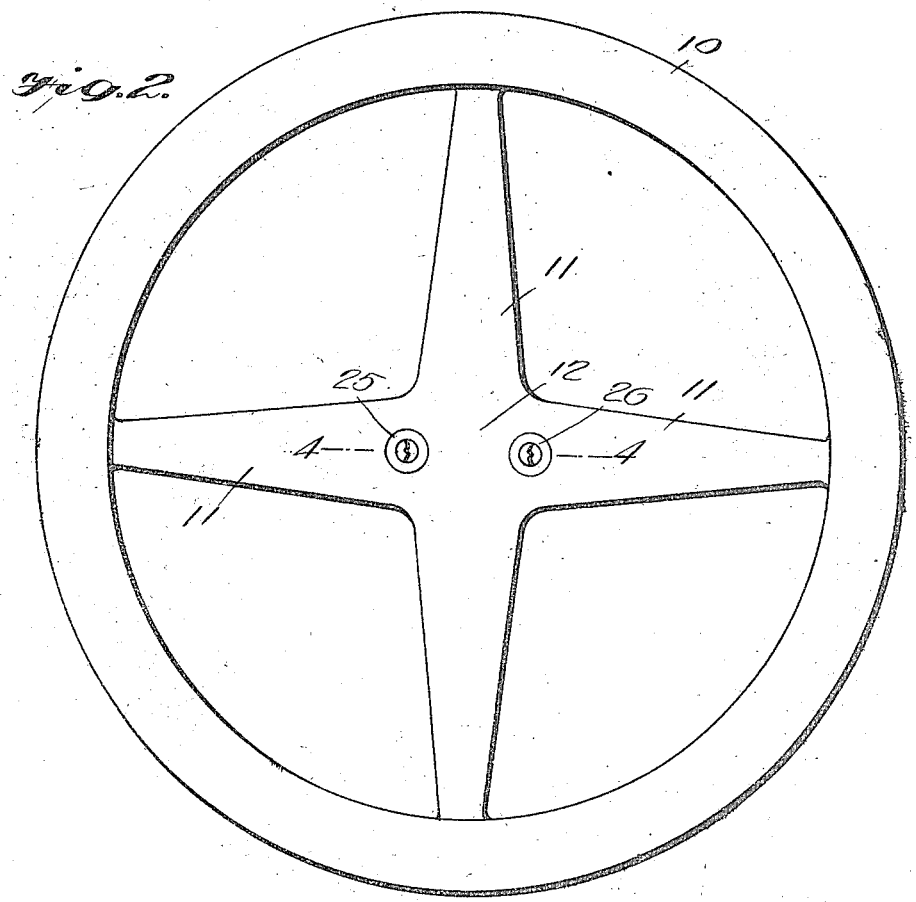
INVENTOR.
Max M. Mueller
BY
ATTORNEYS.

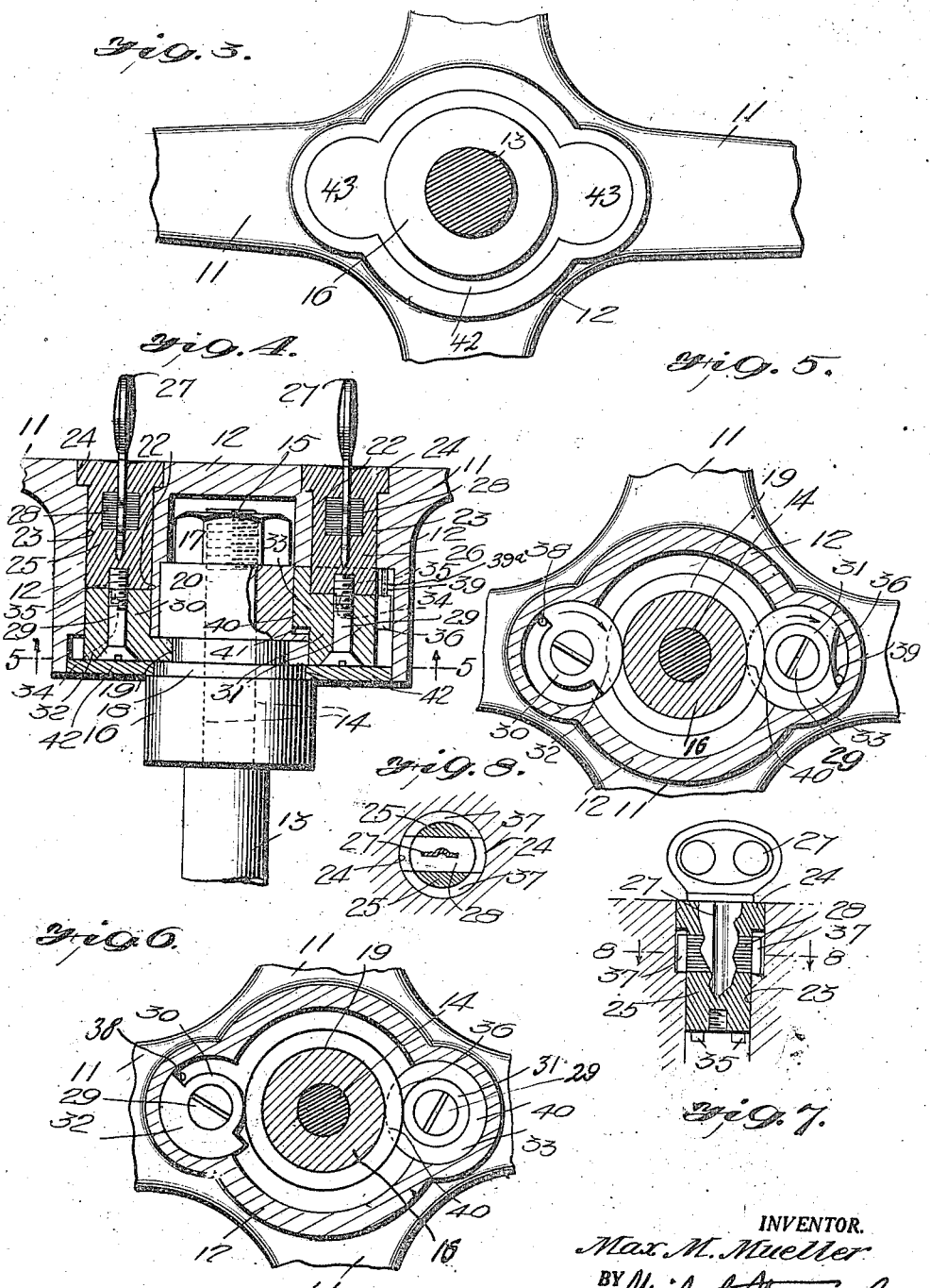

UNITED STATES PATENT OFFICE.

MAX M. MUELLER, OF CHICAGO, ILLINOIS.

STEERING-GEAR LOCK.

1,261,151.

Specification of Letters Patent.  Patented Apr. 2, 1918.

Application filed August 22, 1917. Serial No. 187,609.

*To all whom it may concern:*

Be it known that I, MAX M. MUELLER, a citizen of the United States, residing at Chicago, in the county of Cook and State of Illinois, have invented new and useful Improvements in Steering-Gear Locks, of which the following is a specification.

This invention relates to devices for preventing theft or unauthorized use of automobiles and other motor vehicles, and more particularly to devices of this kind which are applicable to the steering gear of the car for rendering the same inoperative and thus preventing the car from being steered.

The invention has for its object to provide a device of the kind stated which is simple in construction and highly efficient in operation, and to this end it consists in a novel combination and arrangement of parts to be hereinafter described and claimed.

In order that the invention may be better understood, reference is had to the accompanying drawings forming a part of this specification, and in said drawings:

Figure 1 is an elevation of a steering wheel;

Fig. 2 is a plan view thereof;

Fig. 3 is a bottom plan view of the steering wheel hub;

Fig. 4 is an enlarged section on the line 4—4 of Fig. 2;

Figs. 5 and 6 are sections on the line 5—5 of Fig. 4 showing the parts in different positions;

Fig. 7 is a transverse section of one of the locks, and

Fig. 8 is a cross section on the line 8—8 of Fig. 7.

Referring specifically to the drawings, 10 denotes the rim of a steering wheel the same being carried by spokes 11 radiating from a hub 12 mounted on the steering post 13. Near the top, the post 13 is reduced, as shown at 14, and threaded at 15. On the reduced portion 14 of the post is mounted a sleeve 16, and above the same a nut 17 is screwed on the threaded portion 15. Intermediate its ends, the sleeve has an encircling groove which is stepped, as shown at 18 and 19, the latter portion of the groove having a greater depth than the former. Above the groove the sleeve is reduced in diameter, as shown at 20. The sleeve is firmly secured to the post 13 by the nut 17, it being clamped down thereby against the shoulder formed on the post by the grooved part 18. The center of the hub 12 has a cavity to accommodate the nut 17 said cavity opening downward and having an enlarged portion 22 in which the portion 20 of the sleeve 16 is slidably housed.

On diametrically opposite sides of the hub cavity, the hub 12 has bores 23 extending parallel to the hub axis and enlarged at the top as shown at 24 to hold rotatable lock barrels 25 and 26 having keys 27 and tumblers 28. To the bottom of the lock barrels are secured, by screws 29, cam shanks 30 and 31, these having cam heads 32 and 33, respectively. Shank 30 and cam 32 (see Fig. 4) have their tops flush, and in these faces are opposite recesses 34 into which extend studs 35 (shown better in Fig. 7) depending from the bottom of the barrel 25, thus rotatably connecting said barrel with the cam 33. By removing the screws 29, the lock barrels 25 may be detached from their cams. As shown in Fig. 5, the contour of cam 32 is semicircular, and that of cam 33 is circular except for a small segment cut away as at 36.

Referring to Figs. 7 and 8, it will be noted that when the keys 27 are inserted, they gather the tumblers 28 to come flush with the surface of the lock barrels 25, after which the latter may be turned with the keys. However, when the keys are withdrawn, the tumblers are projected into the sides of the bores 23 between two segmental projections 37 integral with the wall of the latter, and it is now impossible to turn the barrels by a false key. When the proper keys are inserted, the barrels 25 are designed for a half turn in either direction, this movement being controlled by a pin 38 forming a stop abutment for the ends of the cam 32, and by a pin 39 acting on the ends of an upward extension 39ª of the cam 33.

It will be noted by reference to Figs. 4 and 5 that the cam 32 is positioned so that it may be projected into the grooved portion 19 of the sleeve 16, and when this is done, the steering wheel cannot be slipped off the post 13. The cam therefore acts as a bolt for locking the steering wheel against removal from the post. Upon turning the bolt to the position shown in Fig. 6, it is now clear of the groove 19, whereupon the wheel is unlocked.

The cam 33 also acts as a bolt in connection with the sleeve portion 20, the latter having an arcuate side keeper recess 40 forming a longitudinal keyway defining a bottom shoulder 41 acting as a cover or stop. In Figs. 4 and 5 the full side of the cam is shown seated in the recess 40, and the steering wheel is now locked to the post 13 so that it may turn the latter. Upon withdrawing the cam from the keeper recess, the wheel is unlocked, and it is now free to be turned without imparting motion to the post.

The wheel hub 12 has a bottom cover plate 42 having an enlarged middle portion and reduced ends 43 to fit the open bottom of the hub. The plate also has a circular opening in which the grooved portion 18 of the sleeve 16 seats, the rim of the opening seating on the shoulder on the sleeve produced by the groove. This plate covers the heads of the screws 29 and hence it will be seen that the lock cannot be opened up without considerable trouble. The lock 25 is, ordinarily, not used except to take the wheel assembly apart for oiling or repairs. The lock 26, however, is the service lock and is operated by a different key independent of the lock 25. When the driver leaves the car, the lock 26 is turned to disconnect the steering wheel from the post 13, and as it is now impossible to steer the car, its theft or unauthorized use is prevented.

I claim:

1. The combination of a steering post and a steering wheel carried by the post, the hub of the wheel having a central cavity into which the post extends, and that portion of the post which seats in the cavity having an external encircling groove and an external longitudinal keyway, and a pair of rotatable lock-controlled members carried by the hub, one of said members having a laterally projecting portion adapted to seat in the groove, and the other member being shaped to seat in the keyway and having a portion which clears the same.

2. The combination of a steering post and a steering wheel carried by the post, the hub of the wheel having a central longitudinal cavity into which the post extends, and that portion of the post which seats in the cavity having an external encircling groove and an external longitudinal keyway, and a pair of rotatable lock-controlled members carried by the hub, said hub having longitudinal recesses in which the members seat, one of said members having a laterally projecting portion adapted to seat in the groove, and the other member being shaped to seat in the keyway and having a portion which clears the same.

3. The combination of a steering post and a steering wheel carried by the post, the hub of the wheel having a central longitudinal cavity into which the post extends, and that portion of the post which seats in the cavity having an external encircling groove and an external longitudinal keyway, a pair of rotatable lock-controlled members carried by the hub, said hub having longitudinal recesses in which the members seat, one of said members having a laterally projecting portion adapted to seat in the groove, and the other member being shaped to seat in the keyway and having a portion which clears the same, and coöperating stops on the members and in the recesses for limiting the turning movement of the members.

4. The combination with a steering wheel, of a post on which the hub of the wheel is mounted, said post having an external encircling groove and an external longitudinal keyway, and locks carried by the wheel hub and having bolts adapted to enter the aforesaid groove and keyway, one of the bolts holding the hub against endwise separation from the post, and the other bolt holding the hub against rotary movement on the post.

5. The combination with a steering wheel, of a post on which the wheel is mounted for rotation thereon and endwise removal therefrom, said post having an external longitudinal keyway and an external encircling groove, and separate lock-controlled means for coupling the wheel to the post and holding the same against rotation thereon and endwise removal therefrom, said means having bolts, one of which is adapted to enter the keyway and the other the groove.

In testimony whereof I affix my signature.

MAX M. MUELLER.